(12) United States Patent
Rejman

(10) Patent No.: US 7,397,218 B2
(45) Date of Patent: Jul. 8, 2008

(54) BATTERY PACK

(75) Inventor: Marcin Rejman, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 198 days.

(21) Appl. No.: 11/220,106

(22) Filed: Sep. 6, 2005

(65) Prior Publication Data

US 2006/0055371 A1    Mar. 16, 2006

(30) Foreign Application Priority Data

Sep. 10, 2004    (DE) .................. 10 2004 043 822

(51) Int. Cl.
*H02J 7/00* (2006.01)

(52) U.S. Cl. ........................ 320/112; 429/99

(58) Field of Classification Search ................ 320/112, 320/106, 114; 429/96, 97, 98, 99, 100, 151, 429/154, 177

See application file for complete search history.

(56) References Cited

U.S. PATENT DOCUMENTS

| | | | |
|---|---|---|---|
| 3,536,449 A * | 10/1970 | Astle ........................ 436/179 |
| 4,007,470 A * | 2/1977 | Land ........................ 396/423 |
| 5,017,441 A * | 5/1991 | Lindner ..................... 429/9 |
| 5,200,280 A | 4/1993 | Karasa |
| 5,302,110 A * | 4/1994 | Desai et al. ................ 429/96 |
| 5,316,873 A * | 5/1994 | Scrivano .................... 429/96 |
| 5,489,485 A | 2/1996 | Poet et al. |
| 5,573,869 A * | 11/1996 | Hwang et al. ............... 429/91 |
| 5,626,979 A * | 5/1997 | Mitsui et al. ................ 429/97 |
| 5,631,101 A * | 5/1997 | Amero, Jr. .................. 429/90 |
| 6,428,925 B1 | 8/2002 | Takeno et al. |
| 6,440,601 B1 | 8/2002 | Aoi et al. |
| 6,824,917 B2 * | 11/2004 | Aaltonen et al. ............ 429/97 |
| 2003/0224247 A1* | 12/2003 | Wheeler et al. ............ 429/159 |
| 2004/0062047 A1* | 4/2004 | Camarota et al. .......... 362/399 |
| 2004/0142231 A1* | 7/2004 | Schellenberg et al. ....... 429/53 |
| 2005/0058890 A1* | 3/2005 | Brazell et al. .............. 429/99 |

* cited by examiner

*Primary Examiner*—Adolf Berhane
*Assistant Examiner*—M'Baye Diao
(74) *Attorney, Agent, or Firm*—Michael J. Striker

(57) ABSTRACT

A battery pack for supplying power to an electrical device has a plastic housing having a housing wall with at least one wall section, at least one battery cell which has an outer circumference and is inserted into the housing so that the at least one wall section of the housing wall faces said outer circumference surface of the battery cell, the wall section of the housing and the circumference surface of the at least one battery cell being complementarily shaped along at least one quarter of a circumference of the at least one battery cell and resting against each other in a form-locked manner.

8 Claims, 2 Drawing Sheets

BATTERY PACK

BACKGROUND OF THE INVENTION

The present invention relates to a battery pack for supplying power to an electrical device The terms battery cell and battery pack used here are also intended to include rechargeable current storage devices (rechargeable batteries) or rechargeable battery packs.

Battery packs for supplying power to electrical devices such as hand-guided power tools usually have a housing made of plastic, which as a rule has several usually cylindrical battery cells inserted into it. The inner cross-sectional dimensions of the housing are usually selected so that the cells can be inserted with ease. In order to assure a definite position of the cells in the housing, the cells frequently rest with their circumference surfaces against support surfaces of the housing; in addition, adjacent cells contact one another along parallel lines on their circumference surfaces. Between the circumference surfaces of the cells and the housing, there are frequently larger intermediate spaces. The air in these intermediate spaces functions as a thermal insulator and slows the transmission of heat from the battery cells through the housing wall to the surroundings. This is disadvantageous primarily in newer battery cells with higher power conversions since there is the danger of the battery cells overheating when the power loss inside the housing is not conveyed quickly enough out of the housing in the form of heat. Because of this danger of overheating, the battery pack can have a lower power conversion.

SUMMARY OF THE INVENTION

Accordingly, it is an object of the present invention to provide a battery pack for supplying power to an electrical device and which avoids the disadvantages of the prior art.

In keeping with these objects and with others which will become apparent hereinafter, one feature of the present invention resides, briefly stated, in a battery pack for supplying power to an electrical device, comprising a plastic housing having a housing wall with at least one wall section; said at least one battery cell which has an outer circumference and is inserted into said housing so that said at least one wall section of said housing wall faces said outer circumference surface of said battery cell, said wall section of said housing and said circumference surface of said at least one battery cell being complimentarily shaped along at least one quarter of a circumference of said at least one battery cell and resting against each other in a form-locked manner.

The battery pack is designed in accordance with the present invention it has the advantage over the prior art that the large-area contact of the circumference surfaces of the battery cell or of each of the battery cells against the housing wall is able to improve the transmission of heat from the cell or from each of the cells into the housing wall and is therefore also able to reduce the thermal resistance between the battery cells and the surroundings. This in turn makes it possible to increase the power conversion of the battery cells without the danger of them overheating.

In battery packs with a multitude of battery cells situated one above another, for example battery packs with a rod-shaped housing, whereas the wall of the housing rests in a form-locked manner against the circumference surface of the cells, preferably along essentially their entire circumference, in battery packs with a multitude of battery cells situated next to one another, the proportion of the circumference surfaces of these cells resting in a form-locked manner against the housing wall depends on the number and arrangement of the batteries inside the battery pack. In battery packs with only two cells situated next to each other, the housing wall and the circumference surfaces of the two cells rest snugly against each other along at least approximately half of the circumference surface of each cell, whereas in battery packs with a three cells arranged next to one another in the form of an equilateral triangle, the contact surfaces preferably each extend over at least approximately one third of the circumference of the cells.

In another preferred embodiment of the present invention, the wall section of the housing and the circumference surface of the battery cells are pressed against one another in the region of their contact surfaces, which can further improve the transmission of heat between the wall section and the cells.

In order to press against the circumference surface of a cell, the housing can be advantageously manufactured of a material that is sufficiently elastic to rest uniformly against the circumference surfaces of the battery cells and thus to compensate for tolerances in their geometry. In order to prevent the wall sections that are adapted to the circumference surfaces of the cells from hindering insertion of the cells into the housing, the housing wall can be suitably provided with a break that is preferably slot-shaped and extends transversely to the direction of the elastic deformation so that the housing can spread open by a certain amount when the battery cells are inserted. In order to maintain the tightness of the housing, the wall sections adjoining the break can overlap and can be provided with a seal in the overlap region.

In battery packs with one or more tiers, each with several battery cells arranged next one another in a group, a core can be alternatively or additionally provided, which is suitably inserted into the triangular interstice between adjacent cells and presses these cells outward against the housing wall. The core is preferably a separate part from the housing and can, for example, be rigidly connected to a cover of the housing so that when the housing is closed, the core is inserted into a triangular interstice between adjacent cells, pressing them away from each other and against the housing wall.

According to another preferred embodiment of the present invention, in battery packs that have a number of battery cells situated next to one another in the housing, the wall sections of the housing wall resting in a form-locked manner against the circumference surfaces of the cells constitute the vertices of a polygonal housing cross-section, which vertices are rounded to accommodate cylindrical cells, preferably with the curvature radius of the circumference surfaces of these cells. Particularly in the latter case, the housing can be even better adapted to the form of the cells if, between the wall sections that rest against the cells in a form-locked manner, the housing has inwardly contracting wall sections, which permits a further enlargement of the contact surfaces between the cells and the housing wall.

The novel features which are considered as characteristic for the present invention are set forth in particular in the appended claims. the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
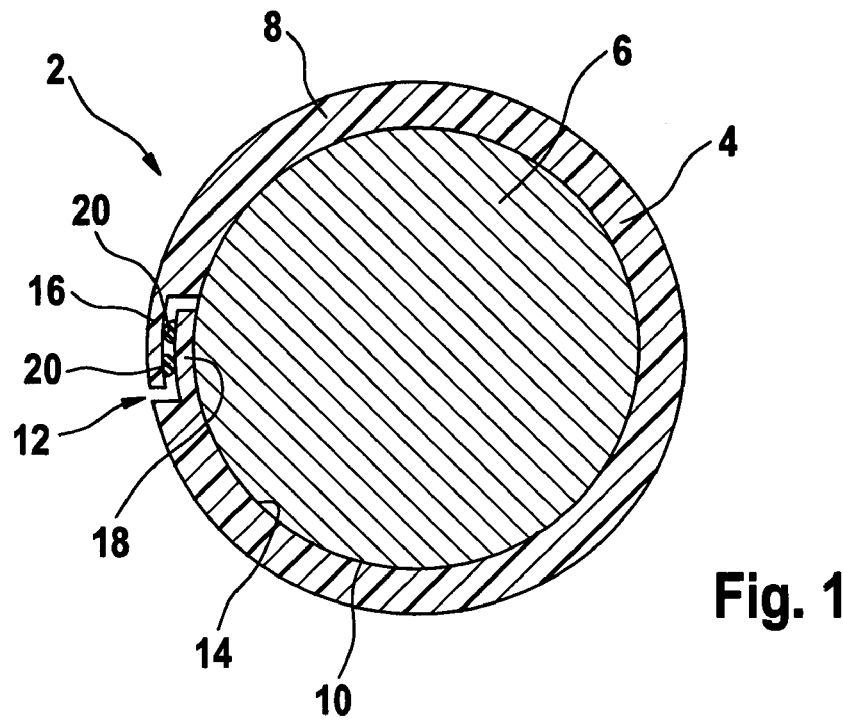
FIG. 1 is a simplified cross-sectional view of battery pack with a rod-shaped cylindrical housing and a number of cylindrical battery cells inserted one on top of another inside the housing.

The battery packs 2 shown in the drawings are used as a power supply for an electrical device such as a hand-guided power tool (not shown). They are essentially comprised of a housing 4 made of injection-molded plastic, one or more tiers of cylindrical battery cells 6 contained inside the housing 4, and a cover (not shown) that closes the housing 4 at the end surface of the uppermost tier of cells 6. The cover, which as a rule is constituted by a part of the electrical device, has two contacts that come into contact with terminals of the battery pack when the housing 4 is closed in order to connect the series-connected or parallel-connected cells 6 contained in the housing 4 to a circuit of the consumer of the electrical device.

The housing 4 has essentially one end wall (not shown) facing one end surface of the cells and a circumference wall 8 that is integrally joined to the end wall and partitions off the cylindrical circumference walls 10 of the cells 6 from the surroundings.

In the battery pack 2 with a one-cell cross section depicted in FIG. 1, the circumference wall 8 has a circular ring-shaped cross-section except for a slot-shaped break 12 extending in its longitudinal direction. The inner diameter of the circumference wall corresponds to the outer diameter of the cell 6 or cells accommodated in the housing 4 or is slightly smaller than it or them so that the inner surface 14 of the wall 8 rests in a snug, form-locked manner against the cylindrical circumference wall 10 of the cell 6 or cells, which also compensates for possible diameter tolerances of the cell 6 or cells.

The slot-shaped break 12 in the housing wall 8 makes it possible for it to be pushed open slightly upon insertion of the cell 6 or cells, which on the one hand facilitates the insertion of the cell 6 or cells and on the other hand, due to the elastic restoring forces of the slightly spread-open housing wall 8 around the entire circumference of the cell 6 or cells provides for a certain amount of pressure of the inner wall surface 14 against the circumference surface 10 of the cell 6 or cells. In order to prevent the penetration of moisture through the slot-shaped break 12 in the housing wall 8, the edges 16, 18 of the wall overlap and can also be provided with sealing strips 20 in the region in which they overlap.

Figure 2:
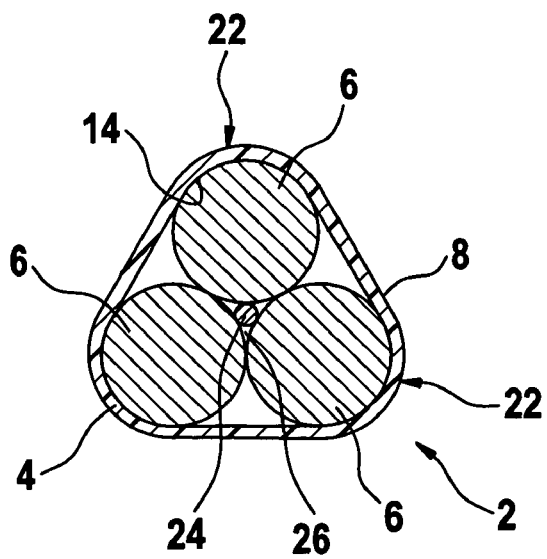
FIG. 2 is a simplified cross-sectional view of a battery pack with a housing that is essentially triangular in cross-section, three cylindrical battery cells inserted into the housing next one another, and a cylindrical core inserted into the triangular interstice or intermediate space between the cells.
Figure 3:
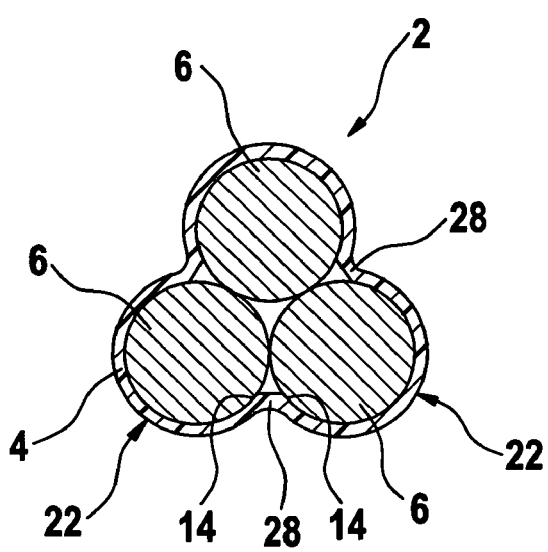
FIG. 3 is a simplified cross-section similar to FIG. 2, but shows a battery pack with a slightly different cross-sectional shape of the housing and no core.

The battery packs 2 shown in FIGS. 2 and 3 each contain three cylindrical battery cells 6, which, for optimum use of space, are positioned next one another so that their central axes approximately constitute the vertices of an equilateral triangle.

In the battery pack 2 shown in FIG. 2, the cross-section of the circumference wall 8 of the housing has the outline of a triangle with rounded corners 22 whose curvature radii correspond to the curvature radii of the circumference surfaces 10 of the cells 6 inserted into the battery pack 2. The inner cross-sectional dimensions of the circumference wall 8 are selected or adapted to the cross-sectional dimensions of the cells 6 so that the cells can be easily inserted into the battery pack 2. In addition to the cells 6, the housing 4 here also contains a cylindrical core 24, which, after the cells 6 have been inserted into the housing 4, is slid into the remaining triangular interstice 26 between the cells 6 resting against one another.

The circular cross-sectional surface of the core 24 is slightly larger than the largest circle delimited inside the triangular interstice 26 by the circumference surfaces 10 of the cells 6 so that the insertion of the core 24 presses the cells 6 slightly apart from one another. The circumference surfaces 10 of the cells 6 in the region of the rounded corners 22 of the housing 4 are thus pressed against the complementarily shaped inner surfaces 14 of the circumference wall 8 and provide for a favorable transmission of heat there from the cells 6 into the circumference wall 8 and thus yield a low thermal resistance between the cells 6 and the environment.

In the battery pack 2 with a similar cross-section shown in FIG. 3, between the rounded corners 22, the circumference wall 8 of the housing 4 has inwardly contracting wall sections 28, which can be elastically deformed outward slightly when the cells 6 are inserted, in order to facilitate insertion of the cells 6. Because of the restoring forces of their elastically deformed material, the wall sections 28 then move back into the position shown in FIG. 3 in which they press the cells 6 against one another and provide for a snug, form-locked contact between the circumference wall 8 and the cells in the region of the corners 22. The wall sections 28 also have inner wall surfaces 14 that are complementary to the circumference surfaces 10 of the cells 6 and enlarge the contact surface of the cells 6 against the wall 8. The outer surface of the housing 4 that radiates heat to the environment is also enlarged, which likewise assures an improved dissipation of heat.

Figure 4:
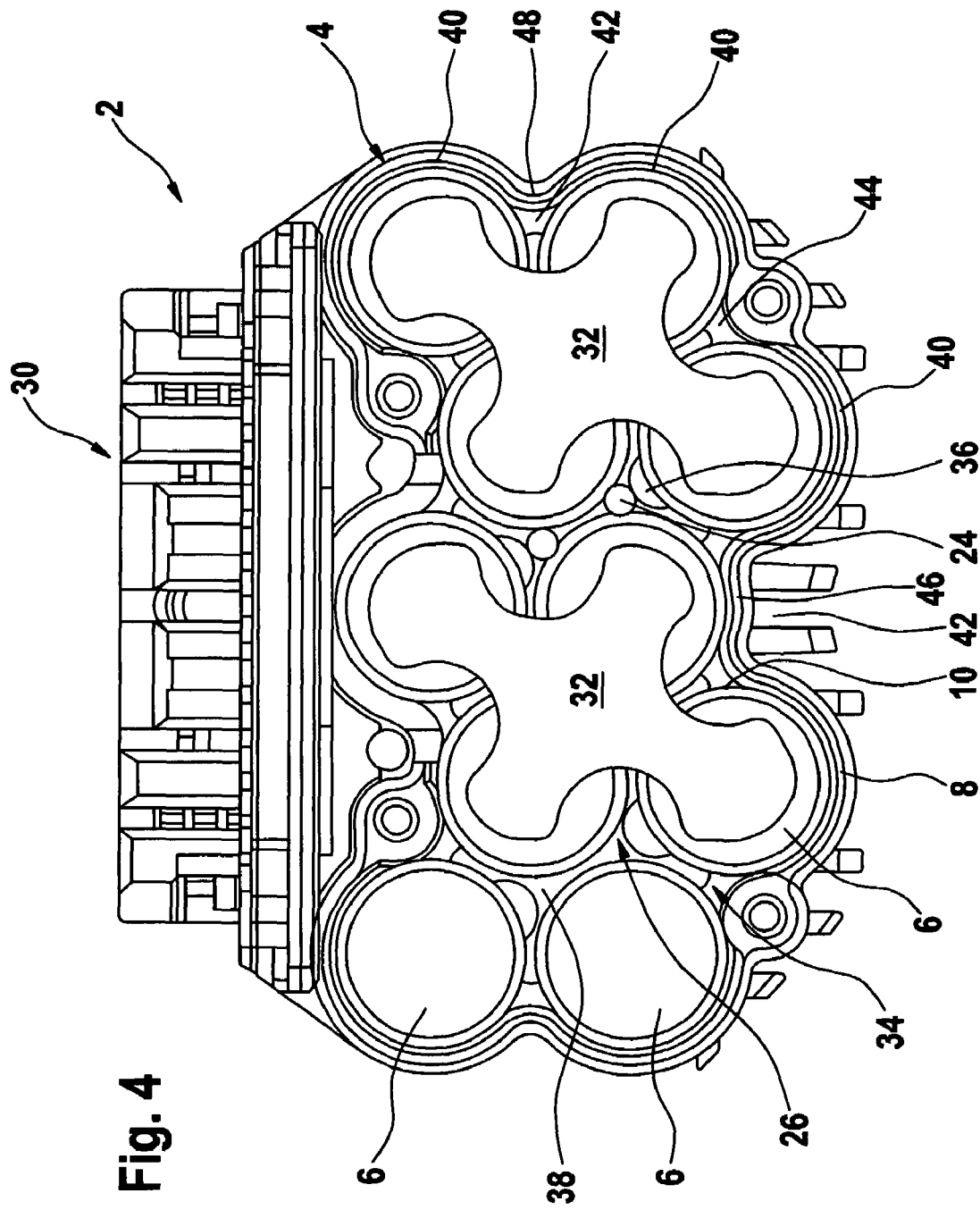
FIG. 4 is a top view of a battery pack with a larger number of battery cells situated next one another in the housing.

The housing 4 of the battery pack 2 shown in FIG. 4 contains one or more tiers, each with ten battery cells 6 in the form of five rows of two cells 6 situated next to one another; the cells 6 of adjacent rows are offset in the transverse direction, toward the left and right in alternating fashion, in order to achieve an optimum use of space. Formed onto one side of its circumference wall 8, the housing 4 here also has an attaching and locking part 30, not described in detail hereinafter, for detachably fastening the battery pack 2 to the electrical device and for producing the electrical connection between the cells 6 and a circuit of the consumer of the electrical device.

Two cell connectors 32 that have a cruciform outline and are made of an electrically conductive metal plate are provided above the upper end surfaces of the cells 6 and connect the like poles of four adjacent cells 6 to one another.

Between the individual cells 6 of each tier, an electrically insulating spacer 34 is provided, which keeps the circumference surfaces 10 of adjacent cells 6 spaced slightly apart from one another in order, for example, to prevent short circuits in the event of vibration-induced damages to the insulation of the cells 6. The spacer 34 is comprised of an elastically flexible, thin-walled, band-like body, which is embodied as double-walled; it nestles snugly against the circumference surfaces 10 of part of the cells 6 and delimits a cross-sectionally crescent-shaped cavity 36 with the circumference surfaces 10 of other cells 6. In the interstices 26 between three adjacent cells 6 arranged in a triangle, the double-walled spacer 34 delimits a cavity 38, which is approximately triangular in cross-section and is bounded by one of the cross-sectionally crescent-shaped cavities 36.

Analogous to the battery pack 2 from FIG. 2, after the insertion of the cells 6 into the housing 4, cylindrical cores 24 whose outer cross-sectional dimensions are slightly larger than the inner cross-sectional dimensions of the cavities 38 can be inserted into all or part of the cavities 38. The insertion of the cores 24 is permitted by an elastic deformation of the spacer 34 in the region of the rounded wall of the cavities 36. After the cores 24 are inserted, they press the cells 6 apart from one another, which causes the latter to be pressed with their cylindrical circumference surfaces 10 situated diametrically opposite from the cores 6 against adjacent, complementarily formed sections 40 of the housing circumference wall 8 so that they rest against the latter in a form-locked manner and without any air gap. A contribution to this effect is also made by the inherent elasticity of the plastic material of the circumference wall 8, which additionally provides for a compensation for possible diameter tolerances of the cells 6.

In a manner similar to the battery pack from FIG. 3, in the gaps 42, which are formed by the offset of the cells in neighboring rows and are situated between the outer cells 6 of two cell rows space apart from each other, and in the triangular interstices 44 that open outward between two adjacent cells 6, the circumference wall 8 of the housing 4 has wall sections 46, 48 that contract inward into the gaps 42 or triangular interstices 44 in order to adapt the circumference wall 8 as closely as possible to the form of the external outline of the cell pack at every point. This adaptation on the one hand makes it possible to maximize the size of the contact area between the cells 6 and the circumference wall 8 so that despite the cylindrical cross sections of the cells 6, the circumference wall 8 rests against the circumference surfaces 10 of the battery cells 6 along at least half their circumference. On the other hand, air-filled intermediate spaces between the circumference surfaces 10 of the cells 6 and the circumference wall 8 can be largely avoided and the external surface area of the housing can be increased, which further improves the dissipation of heat from the cells 6 to the environment.

Although the battery cells 6 in the battery packs 2 shown are embodied in the form of AA cells, C cells, or D cells with a circular cross-section, it goes without saying that when cells 6 with other cross-sectional forms are used, the housing 4 of the battery pack 2 has a shape that is adapted to them.

It will be understood that each of the elements described above, or two or more together, may also find a useful application in other types of constructions differing from the types described above.

While the invention has been illustrated and described as embodied in, it is not intended to be limited to the details shown, since various modifications and structural changes may be made without departing in any way from the spirit of the present invention.

Without further analysis, the foregoing will reveal fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letter Patent is set forth in appended claims.

The invention claimed is:

1. A battery pack for supplying power to an electrical device, comprising a plastic housing having a housing wall comprising a plurality of wall sections, said housing wall forming a circumference wall; a plurality of battery cells inserted into said housing and situated next to one another, each battery cell having an outer circumference and so that said plurality of wall sections of said housing wall rest in a form-lock manner against the circumference surfaces of said battery cells, said wall sections of said housing and said circumference surfaces of said battery cells being complementarily shaped along at least one quarter of a circumference of said battery cells and wherein said housing has additional wall sections comprising an inner wall section and an outer wall section that both contract inward between said wall sections that rest against said circumference surfaces of said battery cells to adapt the circumference surfaces of said battery cells as closely as possible and to increase the external surface area of the housing.

2. A battery pack as defined in claim 1, wherein said wall section of said housing and said circumference surface of said at least one battery cell are complementarily shaped along essentially an entire circumference of said at least one battery cell and rest against each other in a form-locked manner.

3. A battery pack as defined in claim 1, wherein said wall section of said housing and said circumference surface of said at least one battery cell are pressed against each other along a contact surface.

4. A battery pack as defined in claim 1, wherein said housing is elastically deformable, and said wall section of said housing and said circumference surface of said battery cell are pressed against each other due to an elastic deformation of said housing.

5. A battery pack as recited in claim 1, wherein said housing is elastically deformable and has a break extending transversely to a direction of an elastic deformation of said housing.

6. A battery pack as defined in claim 1, wherein said housing has a plurality of said wall sections which are pressed from different directions in a form-lock manner against adjacent ones of said circumference surfaces of said battery cells that are inserted into said housing.

7. A battery pack as defined in claim 6, wherein said adjacent battery cells are pressed against one another.

8. A battery pack as recited in 6; and further comprising a core that is inserted into a triangular interstice between adjacent ones of said battery cells in said housing and presses said battery cells against adjacent wall sections of said housing.

* * * * *